(12) United States Patent
Miller et al.

(10) Patent No.: US 11,814,532 B1
(45) Date of Patent: Nov. 14, 2023

(54) COATINGS WITH ANTIMICROBIAL COPPER GLASS NANOPARTICLES AND DIOL COMPOUNDS

(71) Applicant: SWIMC LLC, Cleveland, OH (US)

(72) Inventors: Katherine A. Miller, Cleveland, OH (US); Tony A. Rook, Cleveland, OH (US)

(73) Assignee: SWIMC LLC, Cleveland, OH (US)

( * ) Notice: Subject to any disclaimer, the term of this patent is extended or adjusted under 35 U.S.C. 154(b) by 303 days.

(21) Appl. No.: 15/929,500

(22) Filed: May 6, 2020

Related U.S. Application Data

(60) Provisional application No. 62/992,389, filed on Mar. 20, 2020, provisional application No. 62/846,404, filed on May 10, 2019.

(51) Int. Cl.
| | | |
|---|---|---|
| *C09D 133/08* | (2006.01) | |
| *C08K 5/053* | (2006.01) | |
| *C09D 5/02* | (2006.01) | |
| *C08K 3/40* | (2006.01) | |
| *C08K 7/18* | (2006.01) | |

(52) U.S. Cl.
CPC ........... *C09D 133/08* (2013.01); *C08K 5/053* (2013.01); *C09D 5/025* (2013.01); *C08K 2003/085* (2013.01); *C08K 3/40* (2013.01); *C08K 7/18* (2013.01)

(58) Field of Classification Search
CPC .............................. C09D 5/025; C08K 5/053
See application file for complete search history.

(56) References Cited

U.S. PATENT DOCUMENTS

| | | | | |
|---|---|---|---|---|
| 5,604,830 | A  * | 2/1997 | Kuder et al. | G02B 6/3885 385/71 |
| 7,582,681 | B2* | 9/2009 | Schmaus et al. | A61K 8/345 424/44 |
| 8,106,111 | B2* | 1/2012 | McCaulley et al. | A01N 31/04 524/383 |
| 9,017,473 | B2* | 4/2015 | Van Hemelryck et al. | C09D 7/63 106/18.32 |
| 2015/0225572 | A1 | 8/2015 | Jiang et al. | |
| 2017/0172151 | A1 | 6/2017 | Bookbinder et al. | |
| 2019/0071575 | A1* | 3/2019 | Baum et al. | C09D 7/61 |

FOREIGN PATENT DOCUMENTS

WO     2018017557  A1    1/2018

* cited by examiner

*Primary Examiner* — Vickey Nerangis
(74) *Attorney, Agent, or Firm* — Honigman LLP

(57) ABSTRACT

Antimicrobial compositions and coating compositions including antimicrobial compositions including copper glass nanoparticles and an additive alkyldiol compound. Coating compositions including the antimicrobial composition exhibit enhanced antimicrobial efficacy and improved coatings performance characteristics including ability to appropriately shade for a base, starting masstone color, as compared to coatings compositions containing copper glass nanoparticles and no such alkyldiol additives.

15 Claims, No Drawings

COATINGS WITH ANTIMICROBIAL COPPER GLASS NANOPARTICLES AND DIOL COMPOUNDS

CROSS-REFERENCE TO RELATED APPLICATION

This application claims the benefit of U.S. Provisional Pat. Application No. 62/846,404 filed on May 10, 2019, and U.S. Provisional Pat. Application no. 62/992,389, filed on Mar. 20, 2020, the entireties of which are hereby incorporated by reference.

FIELD OF THE INVENTION

This invention relates to coatings that contain additives that exhibit preservative antimicrobial effect, in particular copper glass biocides and alkyldiol compounds or mixtures containing alkyldiol compounds.

BACKGROUND

Paints typically contain four essential ingredients: carrier liquid, binder, pigment, and additives. Each of such ingredients may comprise a single component or several different items mixed into the paint.

The carrier liquid is a fluid component of the paint which serves to carry all of the other paint components. The carrier liquid is part of the wet paint and usually evaporates as the paint forms a film and dries on a surface. In latex paints, the carrier liquid is usually water. In oil-based or solvent-borne paints, the carrier liquid is usually an organic solvent. The amount and type of liquid is usually determined by features of the other paint components.

The binder component of a paint is what causes the paint to form a film on and adhere to a surface. In a latex paint, the binder comprises a latex resin, usually selected from acrylics, vinyl acrylics, or styrene acrylics. In a latex paint, the latex resin particles usually are in a dispersion with water as the carrier liquid. In a solvent borne paint or coating, the binder or film forming agent comprises a resin often selected from acrylic-amino, alkyd, polyurethane, epoxy, or a number of other natural or synthesized resins.

Pigments provide the paint with both decorative and protective features. Pigments are solid particles used to provide the paint with various qualities, including but not limited to color, opacity, and durability. The paint may also contain other solid particles such as polyurethane beads or other solids. Pigments and other solids or extenders add bulk to the paint and their levels are related to the gloss or flatness of the paint.

A multitude of additives may be included in paints. The additives are typically used at relatively low levels in the paint formulation, but contribute to various properties of paints, including rheology, stability, paint performance, and application quality.

Biocides, or specifically, antibacterial agents, are additives which have bacteriostatic and bactericidal properties. Biocides work to kill bacteria by one or more of several different mechanisms, including but not limited to interfering with cell wall synthesis, damaging the cell membranes, inhibiting protein synthesis, and interfering with nucleic acid synthesis. Some biocides may also have anti-viral effects, serving to inactivate viruses, such as cold and flu viruses. Additionally, in coatings, biocides may have a preservative effect to prevent in-can microbial spoilage and ensure paint stability, and may also have a kill effect, whereby a biocide in a dried paint film kills or inactivates bacteria and/or viruses. Frequently, different materials are used in the same paint for preservative and kill effects, as there is no guarantee that a material that effectively kills or inactivates bacteria or viruses in a dried paint film will also act as an effective preservative and vice versa.

Paint and coatings must be adequately preserved to remain useful through transport and storage. Spoilage of paint in a container can result in putrefaction, lowered pH, gas formation, and changes in viscosity that may ruin the paint for its intended purpose.

A variety of biocidal agents are well known and are used for various purposes. Such biocides include organic biocides including organic acids, phenols, alcohols, and quaternary ammonium compounds. Quaternary ammonium compounds act as biocides by damaging cell membranes and killing bacteria. Organic biocides further include conventional isothiazolinone additives including, but not limited to, benzisothiazolinone ("BIT") and methylisothiazolinone ("MIT"). BIT and MIT, while effective biocides for their preservative effects in paint, are subject to significant supply chain/manufacturing risks including limited production sources, and regulatory risks. There are also inorganic biocidal agents, for example, those containing metal ions, such as silver, zinc (including zinc pyrithiones), and copper. One mechanism of action by which copper achieves antimicrobial activity is believed to be alteration of protein structures, which renders the proteins useless and resulting in deactivation of bacteria or viruses. Copper also interacts with lipids, causing holes in the cell membrane of bacteria that leak essential cell nutrients, resulting in cell death. Other inorganic biocides include phosphates, metal ion, metal or other biocide-containing zeolites or hydroxyapatites.

Copper biocides include copper glass nanoparticles or composites as described in U.S. Pat. Application Publication No. US 2015/0225572 A1. This patent application is herein incorporated by reference in its entirety.

Copper glass antimicrobial nanoparticles, while contemplated in related art for their kill effect in dried paint films, are not used as paint/coatings preservatives, because a relatively high concentration of copper glass, even when used in combination with conventional biocide packages, is required to achieve appropriate preservative effect, and such high levels result in an undesirable orange, yellow, or red color. This discoloration makes impossible the appropriate coloration/tinting of a paint, thus nullifying the decorative purpose of paints.

Inventive alkyldiol materials disclosed herein are not known to contribute to biocidal preservative effect in the coatings industry, and are not used or known in forms suitable for paint or with copper glass.

DETAILED DESCRIPTION OF THE INVENTION

It has been found in accordance with the present invention, surprisingly, that coatings compositions containing an antimicrobial composition containing copper glass nanoparticles and an additive comprising an alkyldiol compound, exhibit enhanced antimicrobial efficacy and improved coatings performance characteristics including ability to appropriately shade for a base, starting masstone color, as compared to coatings compositions containing copper glass nanoparticles and no such alkyldiol additives. Adequate antimicrobial efficacy and improved coatings performance characteristics including the ability to appropriately shade are provided without the need for the use of a conventional biocide like isothiazolinones.

The present invention comprises, in one embodiment, a paint composition comprising water, latex binder resin, pigment, and additives, wherein such additives include, but are not limited to, copper glass nanoparticles and an alkyldiol additive.

In another embodiment, the present invention comprises a paint composition comprising an organic solvent, an acrylic-amino, alkyd, polyurethane, epoxy or other compatible resin, pigment, and additives, wherein such additives include, but are not limited to, copper glass nanoparticles and an alkyldiol additive.

In another embodiment, the invention comprises a coated article, whereby the article is coated with the copper glass nanoparticle and alkyldiol additive-containing coatings compositions disclosed herein. In certain embodiments, the coatings composition is formulated for coating outside or inside surfaces of an architectural structure. In other embodiments, the coatings composition is formulated for coating the inside of a beverage can, for covering a steel coil, for coating a plastic, for lining an industrial tank (e.g., water tanks, chemical bulk tanks, etc.), or for protective and marine applications.

In some useful embodiments, the copper glass nanoparticles constitute 1 g/gallon to 5 g/gallon of the coatings composition. In other useful embodiments, the copper glass nanoparticles constitute 1 g/gallon to 4 g/gallon of the coatings composition, in other embodiments 1.2 g/gallon to 3.8 g/gallon, in still others 2 g/gallon to 3.5 g/gallon, and in still others 2 to 3 g/gallon.

In some useful embodiments, the alkyldiol additives, comprising a diol compound, are present in a coatings composition at 1000 to 7500 ppm by weight of the composition. In other useful embodiments, the alkyldiol additives are present at 2000 to 5000 ppm by weight, in other embodiments 2500 to 4500 ppm, and in still others 3000 to 4000 ppm.

Copper Glass Nanoparticles

The copper glass nanoparticles useful in the present invention have individual antimicrobial effect, without the aid of other biocides. Such copper glass nanoparticles may be core/shell nanoparticles with a glass shell and copper ion core as is described in Pat. Application Publication No. US 2015/0225572 A1 ("the '572 Application"). As described in the '572 Application, the preferred state of copper ion is the $Cu^{+1}$ state with $Cu^0$ and $Cu^{+2}$ optionally present. In some embodiments, the glass shell may comprise a borophosphosilicate glass with a porous $S_1O_2$ structure that at least partially surrounds the copper. One such useful copper glass nanoparticle is called Guardiant™, available as a powder from Corning Inc. (Corning, NY).

Alkyldiol Additives

Suitable alkyldiol additives for the present invention and copper glass nanoparticles have been found, surprisingly, to enhance antimicrobial effect in coatings containing the copper glass nanoparticle powders, thus making possible the formulation of coatings with sufficiently low copper glass nanoparticle concentration to avoid discoloration. Such alkyldiol additives comprise a diol compound.

Exemplary alkyldiol additives of the present invention include linear, C5 - C11 alkyl diols including 1,2-hexanediol, 1,2-heptanediol, 1,2-octanediol, 1,2-nonanediol, 1,2-decanediol, and blends thereof. Alkyldiol additives may also be blends of diol compounds and an mono or aryl alcohol. Further exemplary alkyldiol additive compounds and blends are shown below in TABLE 1. Percents in TABLE 1 refer to weight percent of the alkyldiol additive.

TABLE 1

| Exemplary Alkyldiol Additives | |
|---|---|
| Chemistry | Structure(s) |
| 1,2-Hexanediol (50%) and 1,2-Octanediol (50%) (Caprylyl Glycol) Blend | |
| Blend of 1,2-Hexanediol, 1,2-Octanediol, and Methylbenzyl Alcohol | |
| 1,2-Octanediol (Caprylyl Glycol) | |
| 1,2-Decanediol | |
| Blend of Phenoxyethanol (right) (85%) and 1,2-Decanediol (15%) | |

TABLE 1-continued

Exemplary Alkyldiol Additives

| Chemistry | Structure(s) |
|---|---|
| Blend of Methyl Benzyl Alcohol (85%) and 1,2-Decanediol (15%) | |
| Blend of Phenyl Propanol(85%) and 1,2-Decanediol (15%) | |
| Blend of Phenoxyethanol (75%) and 1,2-Decanediol (25%) | |

Carrier Liquid

Coatings compositions of the present invention may comprise a carrier liquid prior to application to a substrate. The carrier liquid may be water, include water, or be water-based (>50% water in the carrier liquid system). The carrier liquid may further be a solvent selected from aliphatic, cycloaliphatic and aromatic hydrocarbons such as white spirit, cyclohexane, toluene, xylene and naptha solvent, esters such as methoxypropyl acetate, n-butyl acetate and 2-ethoxyethyl acetate; octamethyltrisiloxane, or other solvents used in solvent borne systems and mixtures thereof. Carrier liquids may also be other liquids used in paints, adhesives, sealants, caulks, and mineral and pigment slurries.

In a preferred embodiment of this invention, the carrier liquid of a coatings composition is water or is water-based (>50% water in the carrier liquid system).

Carrier liquids typically constitute 5-50% by volume of the paint or coating composition.

Binders, Other Additives, Pigments and Fillers

Coatings compositions in accordance with the present invention may comprise for example, at least about 17% by weight, to about 55% by weight of binder polymer solids. Binders useful in latex paint compositions are known in the art and include polymeric binders, such as acrylics, vinyl acrylics, or styrene acrylics binders. Binders useful in solvent-borne paint/coating compositions are known in the art and include polymeric binders such as acrylic-amino, alkyd, polyurethane, epoxy, and a number of other natural or synthesized resins. In certain embodiments of the present invention, the copper glass nanoparticles and alkyldiol additives may be added to a coatings composition individually, together, or mixed into other components of the coatings composition at varying stages of the coatings composition formation.

The inventive coatings composition may also include various other additives, including but not limited to thickeners, such as urethane thickeners, and acrylic thickeners in amounts up to about 10% by weight, for example about 1% to about 2%. Synthetic organic materials might also be incorporated; these include plastic beads, hollow spheres or other similar materials. Other optional components include glycols such as ethylene and/or propylene glycol in amounts up to about 7% and other solvents such as diethylene glycol dibenzoate and dipropylene glycol dibenzoate in amounts up to about 3%. The coating composition may also contain pigment dispersing agents which can be solvents or surfactants; additional wet paint preservatives; additional dry film preservatives; foam control agents such as oils, fatty acids and silicones; slip and mar additives; adhesion promoters, and/or other known paint additives. The paint composition of the present invention may also comprise further biocides or preservatives including but not limited to metal ion containing compounds, polymeric biocides, quaternary ammonium compounds, heterocyclic compounds, phenols, organometallics, aldehydes, proteins, peroxygens, alcohols, enzymes, polypeptides, and halogen releasing compounds.

In one useful embodiment, the coating composition of the present invention is substantially free or totally free of amines.

Exemplary coatings compositions of the present invention may further comprise at least about 5% and up to about 50% by weight pigments. Such pigments may comprise inorganic pigments, such as titanium dioxide. The paint composition comprises, for example, zero percent (for an ultradeep paint), at least about 11% by weight, further for example, at least about 12% by weight, further for example, at least about 13% by weight, further for example, at least about 14% by weight, further for example at least about 15% by weight, further for example, at least about 16%, further for example at least about 17%, further for example, at least about 18%, further for example at least about 19%, and even further for example at least about 20% up to about 30% by weight titanium dioxide. In another useful embodiment, the paint composition comprises more than 10% titanium dioxide. Other colored pigments or dyes may also be added to the paint, alone or in combination, to produce a wide range of colored paint. Suitable additional pigments may include calcium carbonate, talc, clay, silicates, aluminum silicates, calcium metasilicates, aluminum potassium silicates, magnesium silicates, barium sulfates, nepheline syenite, feldspar, zinc oxides or sulfides, or others known to those skilled in the art. Such additional colored pigments may be included in amounts up to about 30% by weight, for example, about 10% to about 20%. In some cases, "pigments" may also refer to functional fillers which are non-water soluble solids. Such functional fillers may include solids which provide additional functional characteristics to the paint, for example, intumescent ingredients, such as ammonium polyphosphates, melamines, pentaerythritol and similar compounds. In one useful embodiment, the coating composition of the present invention is substantially free or totally free of intumscent ingredients such as ammonium polyphosphates, melamines, and pentaerythritol and similar compounds.

The pigment volume concentration, or PVC, of a coating is the ratio of the volume of pigments (including functional fillers) to the volume of total non-volatile material (i.e. pigment and binder) present in the coating. The coating of the present invention preferably has a PVC of about 5 to about 60. In addition, the coating composition of the present invention has a maximum solids content of less than 65% by weight, for example, about 25% by weight to about 60% by weight, further for example about 30% by weight to about 58% by weight.

Paint Composition

In some useful embodiments, the copper glass nanoparticles constitute 1 g/gallon to 5 g/gallon of the coatings composition. In other useful embodiments, the copper glass nanoparticles constitute 1 g/gallon to 4 g/gallon of the coatings composition, in other embodiments 1.2 g/gallon to 3.8 g/gallon, in still others 2 g/gallon to 3.5 g/gallon, and in still others 2 to 3 g/gallon.

In some useful embodiments, the alkyldiol additives, comprising a diol compound, are present in a coatings composition at 1000 to 7500 ppm by weight of the composition. In other useful embodiments, the alkyldiol additives are present at 2000 to 5000 ppm by weight, in other embodiments 2500 to 4500 ppm, and in still others 3000 to 4000 ppm.

In certain useful embodiments, the present invention comprises a paint composition comprising water, latex binder resin, pigment, and additives, wherein such additives include, but are not limited to, copper glass nanoparticles and an alkyldiol additive or a blend of alkyldiol additives, and wherein the copper glass nanoparticles constitute 1 g/gallon to 4 g/gallon of the paint composition and the alkyldiol additive or blend of alkyldiol additives is present in the paint composition at 2000 to 5000 ppm by weight. In these embodiments, the coating composition is effectively preserved without issues of discoloration.

It should be noted that in order to make a latex paint formulation, an appropriate dispersant/surfactant system is needed in order to disperse the pigments in the paint formulation. The process for selecting dispersants/surfactants for paint formulations is well known to those of ordinary skill in the paint formulation art. After selecting a compatible polymer and biocide package or microbially active composition comprised of copper glass nanoparticles and alkyldiol additive(s) as described herein, one of ordinary skill in the art would be able to select a dispersant/surfactant combination in order to make a desired paint composition.

EXAMPLES

Conventional Example 1 - Paint With Copper Glass Nanoparticles and No Traditional Biocides or Alkyldiol Additives For Conventional Example 1, a vinyl/acrylic base paint was prepared according to the amounts and components described below in TABLE 2 ("Conventional Base Paint 1"). The paint was prepared by mixing the following components using techniques known to those of ordinary skill in the art:

TABLE 2

Conventional Base Paint 1

| Description | Conventional Base Paint 1 Wt% |
| --- | --- |
| Plasticizer[1] | 0.9088 |
| Proprietary Defoamer | 0.9088 |
| Rheological thickener[2] | 1.454 |
| Proprietary Vinyl/Acrylic Resin 1 | 24.5364 |
| Proprietary Acrylic Resin 2 | 3.635 |
| Rheological thickener[3] | 0.4544 |
| Dispersant[4] | 0.4544 |
| Water | 32.3204 |
| Nonionic Surfactant[5] | 0.2726 |
| Pigment[6] | 0.159 |
| Anti-settling agent[7] | 0.3635 |
| Pigment[8] | 34.5327 |

1 Benzoflex B-50 from Eastman
2 Rheolate 350D from Elementis Specialties
3 Natrosol Plus 330 from Ashland
4 Tamol 731A from Dow Chemical
5 Triton X-102 from Dow Chemical
6 Soda Ash (Sodium Carbonate, Anhydrous)
7 MIN-U-GEL 400 Attapulgite Clay from Active Minerals International, LLC
8 Calcium Carbonate Guardiant™ copper glass nanoparticles were added to this composition to make three samples of 1 g/gallon, 5 g/gallon, and 10 g/gallon copper nanoparticle concentrations.

Each sample of a differing concentration was then subjected to microbial challenge testing in which preservative efficacy was tested in a manner materially similar to the testing protocol detailed in ASTM D2574 - 16 Standard Test Method for Resistance of Emulsion Paints in the Container to Attack by Microorganisms (2016). The preservative testing used herein is described below. Discrepancies with ASTM D2574 are included in this description.

Duplicate, 50 mL samples of each of the sample compositions having 1 g/gallon, 5 g/gallon, and 10 g/gallon copper nanoparticle concentrations were taken and each of the duplicate samples inoculated with: (Challenge 1) 5.0 mL of pooled culture at approximately $10^9$ CFU/mL on day 0 resulting in a final concentration of approximately $10^8$ CFU/mL within the sample; (Challenge 2) 2.5 mL of pooled culture at approximately $10^9$ CFU/mL on day 7 resulting in a final concentration of approximately $10^8$ CFU/mL within the sample; and (Challenge 3) 1.25 mL of pooled culture at approximately $10^9$ CFU/mL on day 14 resulting in a final concentration of approximately $10^8$ CFU/mL within the sample. Each sample was then incubated at 30° C. ± 2° C. For each sample, duplicate spread plates were made at 72 hours incubation and 7 days incubation from time of inoculation by spreading the sample evenly on an agar plate using aseptic techniques and incubating for 72 hours at 30° C. Challenge testing was also performed with respect to negative controls, which are agar plates with bacterial challenge, but no paint applied. Bacterial survival was quantified according to rating scale shown below in TABLE 3.

TABLE 3

Preservative Testing Rating Scale

| # Colonies | CFU/mL (approx) | Descriptive Rating | Rating |
| --- | --- | --- | --- |
| No growth | $<10^2$ | Clean | 1 |
| 1-5 | $1\times10^2 - 5\times10^2$ | Slight | 2 |
| 6-10 | $6\times10^2 - 1\times10^3$ | Slight | 3 |
| 11-25 | $1.1\times10^3 -$ | Slight/ | 4 |

TABLE 3-continued

| Preservative Testing Rating Scale | | | |
|---|---|---|---|
| # Colonies | CFU/mL (approx) | Descriptive Rating | Rating |
| | $2.5 \times 10^3$ | Moderate | |
| 26-50 | $2.6 \times 10^3 - 5 \times 10^3$ | Moderate | 5 |
| 51-100 | $5.1 \times 10^3 - 1 \times 10^4$ | Moderate | 6 |
| 101-200 | $1.1 \times 10^4 - 2 \times 10^4$ | Moderate/Severe | 7 |
| 201-300 | $2.1 \times 10^4 - 3 \times 10^4$ | Severe | 8 |
| TNTC (rough edges) | $3.1 \times 10^4 - 9 \times 10^5$ | Severe | 9 |
| TNTC (smooth edges) | $1 \times 10^6$ | Severe | 10 |

Wherein "TNTC" = "Too Numerous to Count" and "CFU" = "Colony Forming Unit"

The paint samples with copper glass nanoparticles and no other biocides or alkyldiol additives showed reliable preservative efficacy at 10 g/gallon concentration copper glass nanoparticles and unreliable preservative effect at lower concentrations, 1 g/gallon and 5 g/gallon, as shown below in TABLE 4.

TABLE 4

| | | Preservative Testing Results for Conventional Example 1 | | | | | | | | | | | |
|---|---|---|---|---|---|---|---|---|---|---|---|---|---|
| | | Challenge 1 | | | | Challenge 2 | | | | Challenge 3 | | | |
| | | | 72 Hrs. Sample | | 7 Days Sample | | 72 Hrs. Sample | | 7 Days Sample | | 72 Hrs. Sample | | 7 Days Sample |
| | Cu Glass g/Gal | Challenge 1 | PLT 1 | PLT 2 | PLT 1 | PLT 2 | Challenge 2 | PLT 1 | PLT 2 | PLT 1 | PLT 2 | Challenge 3 | PLT 1 | PLT 2 | PLT 1 | PLT 2 |
| Negative Control A | 0 | | 10 | 10 | 10 | 10 | | 10 | 10 | 10 | 10 | | 10 | 10 | 10 | 10 |
| Negative Control B | 0 | | 10 | 10 | 10 | 10 | | 10 | 10 | 10 | 10 | | 10 | 10 | 10 | 10 |
| 2A | 1g/gal | | 3 | 1 | 2 | 1 | | 9 | 9 | 1 | 1 | | 9 | 9 | 4 | 4 |
| 2B | 1g/gal | | 2 | 2 | 2 | 1 | | 9 | 9 | 1 | 1 | | 10 | 10 | 10 | 10 |
| 3A | 5g/gal | | 2 | 1 | 1 | 1 | | 2 | 1 | 1 | 1 | | 2 | 1 | 1 | 1 |
| 3B | 5g/gal | | 2 | 1 | 2 | 1 | | 1 | 1 | 9 | 9 | | 9 | 9 | 9 | 9 |
| 4A | 10g/gal | | 1 | 1 | 2 | 1 | | 1 | 1 | 1 | 1 | | 2 | 1 | 1 | 1 |
| 4B | 10g/gal | | 1 | 1 | 1 | 1 | | 1 | 1 | 2 | 1 | | 1 | 1 | 1 | 1 |

Base Paints 2 and 3

In the following examples, base, comparative paint compositions were prepared according to the amounts and components described in TABLE 5. Two base, comparative paints (Acrylic Base Paint 2 and Acrylic Base Paint 3) were used. Each was prepared by mixing the following components using techniques known to those of ordinary skill in the art:

TABLE 5

| Acrylic Base Paint Compositions | | |
|---|---|---|
| Description | Acrylic Base Paint 2 Wt% | Acrylic Base Paint 3 Wt% |
| Defoamer[1] | 0.403 | 1.1092 |
| Rheological thickener[2] | 1.4508 | 0.3697 |
| Acrylic Resin[3] | 24.9859 | 42.0569 |
| Opaque Polymer[4] | 4.03 | 3.2351 |
| Rheological thickener[5] | 0 | 0.0508 |
| Proprietary rheological thickener | 0.0806 | 0 |
| Dispersant[6] | 0.6448 | 0 |
| Water | 15.5516 | 14.5075 |
| Nonionic Surfactant[7] | 0.0806 | 0 |
| Pigment[8] | 28.4114 | 14.683 |
| Anti-settling agent[9] | 0.4836 | 0.3696 |

TABLE 5-continued

| Acrylic Base Paint Compositions | | |
|---|---|---|
| Description | Acrylic Base Paint 2 Wt% | Acrylic Base Paint 3 Wt% |
| Pigment[10] | 23.5351 | 19.5957 |
| Pigment[11] | 0.0201 | 0.0293 |
| Base[12] | 0.0806 | 0.1849 |
| Proprietary Surfactant Additives | 0.2418 | 3.8082 |

1 Foamstar ST 2420 from BASF Formulation Additives
2 Rheolate 350D from Elementis Specialties
3 Formashield 12 from Dow Chemical
4 Ropaque Ultra EF from Dow Chemical
5 Natrosol Plus 330 from Ashland
6 Tamol 731A from Dow Chemical
7 Triton X-102 from Dow Chemical
8 Calcite, dry, ground; Sylosiv K300 Aluminosilicate from W.R. Grace; Opti-White P from Burgess; Minex 2 - Nepheline Syenite from Unimin; Calcium Carbonate, ground
9 Attagel Clay 40 from BASF
10 Titanium Dioxide Slurry
11 Red, yellow, blue pigments
12 Caustic Soda-25% (Sodium Hydroxide)

Conventional, Comparative Example 2 - Paint With Copper Glass but No Alkyldiol Additive To each of Acrylic Base Paints 2 and 3 identified above, Guardiant™ copper glass nanoparticles were added to make 5 g/gallon and 10 g/gallon concentration paints. Notably, even concentrations that showed questionable preservative efficacy (5 g/gallon) in Conventional Example 1 showed red, yellow, or orange discoloration in Conventional, Comparative Example 2 as a result of the high levels of copper glass added. Each sample of Acrylic Base Paints 2 and 3 ("Conventional, Comparative Example 2 Paints") with added copper glass nanoparticles were shaded according to a standard shading procedure described below. If a paint cannot be shaded according to standard procedures to achieve a target masstone color, it will be difficult, costly or impossible to adequately color the paint for end user application. This is a significant impediment to paint's decorative purpose.

The Conventional, Comparative Example 2 Paints were shaded according to the following method. Two mil dry film thickness drawdowns of each of the Conventional, Comparative Example 2 Paints were taken on white Leneta charts. Masstone color was measured on a 45/0 spectrophotometer at D65 illuminant, 10 degree observer. Shade hit was walked in to match masstone color SW7006 Extra White, available from the Sherwin-Williams Company. No sample of the Conventional, Comparative Example 2 Paints could be shaded to within tolerance of 1.0 delta E (FMC2) from SW7006 Extra White.

Conventional, Comparative Example 3 - Paint With Alkyldiol Additives but No Copper Glass To Acrylic Base Paint 3, identified above, varying amounts of an alkyldiol (1,2-decanediol) were added in the grind phase of paint making to yield paints with the concentrations listed in TABLE 6, below ("Conventional, Comparative Example 3 Paints"). The Conventional, Comparative Example 3 Paints were further subjected to microbial challenge testing in which preservative efficacy was tested by the method described in Conventional Example 1. Instead of duplicate samples, triplicate, 50 mL samples of each of the Conventional, Comparative Example 3 Paints (with differing 1,2-decanediol concentrations) were taken and similarly inoculated. Challenge testing was also performed with respect to negative controls. Bacterial survival was again quantified according to rating scale shown above in TABLE 3.

Conventional, Comparative Example 3 Paints showed moderate protection/preservation (failing challenge 3) even at high concentrations of alkyldiol.

TABLE 7

| Inventive Paints A, B, C, and D Compositions | | | | |
|---|---|---|---|---|
| Description | Inventive Paint A Wt% | Inventive Paint B Wt% | Inventive Paint C Wt% | Inventive Paint D Wt% |
| Copper Glass Nanoparticles[1] | 4 g/gallon | 4 g/gallon | 4 g/gallon | 4 g/gallon |
| Blend of 1,2-Hexanediol (50%) and 1,2-Octanediol (50%) | 5000 ppm | 0 | 5000 ppm | 0 |
| Blend of 1,2-Hexanediol, 1,2-Octanediol, and Methylbenzyl Alcohol | 0 | 5000 ppm | 0 | 5000 ppm |

1 Guardiant™ Copper Glass Nanoparticles available from Corning, Inc.

The Inventive Example 1 Paints, with smaller amounts of copper glass nanoparticles than the Conventional, Comparative Example 2 Paints, were all shadeable to SW7006 Extra White masstone color, from the Sherwin-Williams Company, using the method for shading described below.

The Inventive Example 1 Paints were shaded according to the following method. Two mil dry film thickness drawdowns of each of the Inventive Example 1 Paints were taken on white Leneta charts. Masstone color was measured on a 45/0 spectrophotometer at D65 illuminant, 10 degree observer. Shade hit was walked in to match masstone color

TABLE 6

| | | Preservative Testing Results for Comparative Example 3 | | | | | | | | | | | |
|---|---|---|---|---|---|---|---|---|---|---|---|---|---|
| | | Challenge 1 | | | | Challenge 2 | | | | Challenge 3 | | | |
| | | 72 Hours | | 7 Days | | 72 Hours | | 7 Days | | 72 Hours | | 7 Days | |
| 1,2-decanediol Concentration | Test Sample | Plate 1 | 2 | Plate 1 | 2 | Plate 1 | 2 | Plate 1 | 2 | Plate 1 | 2 | Plate 1 | 2 |
| N/A | Negative Control | 10 | 10 | 10 | 10 | 10 | 10 | 10 | 10 | 10 | 10 | 10 | 10 |
| 2,500 PPM | 1A | 7 | 7 | 2 | 2 | 6 | 6 | 9 | 9 | 9 | 9 | 9 | 9 |
| | 1B | 7 | 7 | 2 | 2 | 6 | 6 | 9 | 9 | 9 | 9 | 9 | 9 |
| | 1C | 7 | 7 | 2 | 2 | 6 | 6 | 9 | 9 | 9 | 9 | 9 | 9 |
| 5,000 PPM | 2A | 2 | 1 | 2 | 1 | 9 | 9 | 10 | 10 | 9 | 9 | 9 | 9 |
| | 2B | 2 | 2 | 1 | 1 | 9 | 9 | 10 | 10 | 9 | 9 | 9 | 9 |
| | 2C | 2 | 2 | 1 | 1 | 9 | 9 | 10 | 10 | 9 | 9 | 9 | 9 |
| 10,000 PPM | 3A | 2 | 2 | 1 | 1 | 2 | 1 | 1 | 1 | 9 | 9 | 9 | 9 |
| | 3B | 1 | 2 | 1 | 1 | 1 | 1 | 1 | 1 | 9 | 9 | 9 | 9 |
| | 3C | 1 | 1 | 1 | 1 | 1 | 1 | 1 | 1 | 9 | 9 | 9 | 9 |
| 12,500 PPM | 4A | 2 | 2 | 1 | 1 | 1 | 1 | 1 | 1 | 9 | 9 | 9 | 9 |
| | 4B | 1 | 1 | 1 | 1 | 1 | 1 | 1 | 1 | 9 | 9 | 9 | 9 |
| | 4C | 1 | 1 | 1 | 1 | 1 | 1 | 1 | 1 | 9 | 9 | 9 | 9 |
| 15,000 PPM | 5A | 1 | 1 | 1 | 1 | 1 | 1 | 1 | 1 | 7 | 7 | 9 | 9 |
| | 5B | 1 | 1 | 1 | 1 | 1 | 1 | 2 | 1 | 7 | 7 | 9 | 9 |
| | 5C | 2 | 2 | 1 | 1 | 1 | 1 | 1 | 1 | 7 | 7 | 9 | 9 |

Inventive Example 1 With Copper Glass and Alkyldiol Additives

The inventive examples were made by adding exemplary alkyldiol additives and copper glass nanoparticles to the same Acrylic Base Paints 2 and 3 described above ("Inventive Example 1 Paints", with "Inventive Paints A and B" corresponding to Acrylic Base Paint 2, and "Inventive Paints C and D" corresponding to Acrylic Base Paint 3). Copper glass nanoparticles were added at 4 g/gallon. Inventive example paints contained the copper glass and an alkyldiol additive in the amounts shown below in TABLE 7.

SW7006 Extra White. All samples of the Inventive Example 1 Paints could be shaded to within tolerance of 1.0 delta E (FMC2) from SW7006 Extra White.

The Inventive Example 1 Paints were further subjected to microbial challenge testing in which preservative efficacy was tested by the method described in Conventional Example 1. Instead of duplicate samples, triplicate, 50 mL samples of each of the Inventive Example 1 Paints (Inventive Paints A, B, C, and D) were taken and similarly inoculated. Challenge testing was also performed with respect to negative control. Bacterial survival was again quantified according to rating scale shown above in TABLE 3.

Challenge performance for Inventive Paints A and B and C and D are shown below in TABLES 8 and 9, respectively.

TABLE 8

| | Inventive Paints A and B | | | | | | | | | | | |
|---|---|---|---|---|---|---|---|---|---|---|---|---|
| | Challenge 1 | | | | Challenge 2 | | | | Challenge 3 | | | |
| | 72 Hours | | 7 Days | | 72 Hours | | 7 Days | | 72 Hours | | 7 Days | |
| | Plate | | Plate | | Plate | | Plate | | Plate | | Plate | |
| Test Sample | 1 | 2 | 1 | 2 | 1 | 2 | 1 | 2 | 1 | 2 | 1 | 2 |
| Negative Control | 10 | 10 | 10 | 10 | 10 | 10 | 10 | 10 | 10 | 10 | 10 | 10 |
| A1 | 1 | 1 | 2 | 1 | 2 | 1 | 1 | 1 | 1 | 1 | 1 | 1 |
| A2 | 1 | 1 | 3 | 1 | 1 | 1 | 1 | 1 | 1 | 1 | 1 | 1 |
| A3 | 1 | 1 | 1 | 1 | 1 | 1 | 1 | 1 | 1 | 1 | 1 | 1 |
| B1 | 2 | 1 | 1 | 1 | 2 | 1 | 2 | 2 | 1 | 1 | 1 | 1 |
| B2 | 1 | 1 | 1 | 1 | 2 | 1 | 1 | 1 | 1 | 1 | 1 | 2 |
| B3 | 1 | 1 | 1 | 1 | 1 | 1 | 1 | 1 | 1 | 1 | 1 | 1 |

TABLE 9

| | Inventive Paints C and D | | | | | | | | | | | |
|---|---|---|---|---|---|---|---|---|---|---|---|---|
| | Challenge 1 | | | | Challenge 2 | | | | Challenge 3 | | | |
| | 72 Hours | | 7 Days | | 72 Hours | | 7 Days | | 72 Hours | | 7 Days | |
| | Plate | | Plate | | Plate | | Plate | | Plate | | Plate | |
| Test Sample | 1 | 2 | 1 | 2 | 1 | 2 | 1 | 2 | 1 | 2 | 1 | 2 |
| Negative Control | 10 | 10 | 10 | 10 | 10 | 10 | 10 | 10 | 10 | 10 | 10 | 10 |
| C1 | 2 | 1 | 1 | 2 | 2 | 3 | 2 | 1 | 2 | 1 | 1 | 1 |
| C2 | 2 | 1 | 1 | 2 | 2 | 3 | 1 | 1 | 1 | 1 | 1 | 1 |
| C3 | 2 | 2 | 1 | 2 | 3 | 3 | 1 | 1 | 1 | 1 | 1 | 1 |
| D1 | 2 | 1 | 1 | 1 | 2 | 3 | 1 | 1 | 1 | 1 | 1 | 1 |
| D2 | 1 | 1 | 1 | 1 | 2 | 3 | 1 | 1 | 9 | 9 | 9 | 9 |
| D3 | 2 | 2 | 1 | 1 | 3 | 3 | 1 | 1 | 2 | 2 | 1 | 1 |

The invention claimed is:

1. A coating composition comprising:
   (a) a binder polymer;
   (b) copper glass nanoparticles, wherein each nanoparticle comprises a glass shell and a copper core, the copper core comprising copper oxidation states $Cu^0$, $Cu^{1+}$, $Cu^{2+}$, or combinations thereof, and the glass shell comprising a porous $SiO_2$ structure that at least partially surrounds the copper core;
   (c) an alkyldiol additive; and
   (d) a carrier liquid,
   wherein the copper glass nanoparticles are present in the coating composition in an amount of 1 g/gallon coating composition to 4 g/gallon coating composition; and
   wherein the alkyldiol additive is selected from the group consisting of 1,2-hexanediol, 1,2-octanediol, 1,2-decanediol, 1,2-hexanediol blended with methylbenzyl alcohol, 1,2-octanediol blended with methylbenzyl alcohol, 1,2-decanediol blended with phenoxyethanol, or blends thereof and wherein the alkyldiol additive is present at 2000 to 5000 ppm by weight.

2. The coating composition of claim 1 further comprising at least 10% by weight of a pigment, wherein the pigment is selected from calcium carbonate, talc, clay, silicates, aluminum silicates, calcium metasilicates, aluminum potassium silicates, magnesium silicates, barium sulfates, nepheline syenite, feldspar, zinc oxides, sulfides, titanium dioxide and mixtures thereof.

3. The coating composition of claim 2, wherein the pigment is titanium dioxide in an amount of at least 10% by weight.

4. The coating composition of claim 3, further comprising at least one pigment other than titanium dioxide in an amount up to 10% by weight.

5. The coating composition of claim 1, wherein the alkyldiol additive comprises a blend of 1,2-hexanediol and 1,2-octanediol.

6. The coating composition of claim 1, wherein the alkyldiol additive is present at 3000 to 4000 ppm by weight.

7. The coating composition of claim 1, wherein the binder polymer is present at 7% to 30% by weight.

8. The coating composition of claim 6, wherein the binder polymer is selected from acrylics, vinyl acrylics, styrene acrylics and mixtures thereof, and wherein the carrier liquid is water.

9. The coating composition of claim 1, further comprising a pigment dispersing agent and at least 10% by weight of a pigment.

10. The coating composition of claim 9, wherein the pigment dispersing agent is a solvent or surfactant and is present at lower than 0.5% by weight.

11. The coating composition of claim 1, further comprising one or more additional biocides selected from metal ion containing compounds, polymeric biocides, heterocyclic compounds, phenols, organometallics, aldehydes, proteins, peroxygens, alcohols, enzymes, polypeptides, quaternary ammonium compounds, and halogen releasing compounds.

12. The coating composition of claim 1, further wherein the coating composition passes the ASTM D2574 – 16 test for in-can paint preservation.

13. A coated article comprising:
   (a) substrate surface; and
   (b) a coating on at least a portion of the substrate surface, said coating formed from a paint composition comprising:

a binder polymer;

copper glass nanoparticles, wherein each nanoparticle comprises at a glass shell and a copper core, the copper core comprising copper oxidation states $Cu^0$, $Cu^{1+}$, $Cu^{2+}$, or combinations thereof, and the glass shell comprising a porous $SiO_2$ structure that at least partially surrounds the copper core;

an alkyldiol additive; and water, wherein the copper glass nanoparticles are present in the paint composition in an amount of 1 g/gallon paint composition to 4 g/gallon paint composition; and wherein the alkyldiol additive of the coating on at least a portion of the substrate surface is selected from the group consisting of 1,2-hexanediol, 1,2-octanediol, 1,2-decanediol, 1,2-hexanediol blended with methylbenzyl alcohol, 1,2-octanediol blended with methylbenzyl alcohol, 1,2-decanediol blended with phenoxyethanol, or blends thereof and wherein the alkyldiol additive is present at 2000 to 5000 ppm by weight.

14. The coated article of claim 13, wherein the alkyldiol additive of the coating on at least a portion of the substrate surface comprises a blend of 1,2-hexanediol and 1,2-octanediol.

15. The coated article of claim 13, wherein the binder polymer of the coating on at least a portion of the substrate surface is a blend of a vinyl acrylic resin and an acrylic resin.

* * * * *